United States Patent [19]

Bentley

[11] Patent Number: 4,598,737
[45] Date of Patent: Jul. 8, 1986

[54] HYDRAULIC ACCUMULATOR

[76] Inventor: Ralph L. Bentley, #14 Coach Ct., St. Peters, Mo. 63376

[21] Appl. No.: 763,341

[22] Filed: Aug. 7, 1985

Related U.S. Application Data

[63] Continuation-in-part of Ser. No. 430,821, Sep. 30, 1982, abandoned, and a continuation-in-part of Ser. No. 599,518, Apr. 12, 1984, abandoned.

[51] Int. Cl.$^4$ ............................................. F16L 55/04
[52] U.S. Cl. ..................................................... 138/30
[58] Field of Search ................ 138/30; 417/540; 92/90

[56] References Cited

U.S. PATENT DOCUMENTS

| | | | |
|---|---|---|---|
| 2,290,337 | 7/1942 | Knauth | 138/30 |
| 2,841,180 | 7/1958 | Pier | 138/30 |
| 3,020,928 | 2/1962 | Peet | 138/30 |
| 3,035,613 | 5/1962 | Beatty | 138/30 |
| 3,143,144 | 8/1964 | Peet | 138/30 |
| 3,212,602 | 10/1965 | Jones et al. | 138/30 X |

Primary Examiner—Stephen Marcus
Assistant Examiner—Mark Thronson

[57] ABSTRACT

A hydraulic accumulator device which provides regulated hydraulic energy storage of hydraulic fluid under pressure including a pressure vessel of cross section compatible with the particular hydraulic system pressure and environment and which is provided with a chamber therein, a thin wall cylinder disposed within said chamber, a sealable tubular diaphragm provided with a plurality of adjustable guides disposed within the diaphragm, the diaphragm disposed within the pressure vessel, wherein hydraulic fluid which enters the chamber communicates with a surface of the diaphragm and a pressure controlled gas disposed within the pressure vessel contacts the opposite surface of the diaphragm.

1 Claim, 4 Drawing Figures

HYDRAULIC ACCUMULATOR

BACKGROUND OF THE INVENTION

This application is a continuation-in-part of application Ser. No. 430,821, filed Sept. 30, 1982, now abandoned, and Ser. No. 599,518 filed Apr. 12, 1984, now abandoned.

Generally speaking, hydraulic accumulator devices are included in a hydraulic circuit to provide energy storage, volume fluctuation compensation, fluid dispensing, shock absorbance and the like. In earlier times the hydraulic fluid was caused to work against a piston however now it is a flexible diaphragm which separates the hydraulic fluid from a gas stored at a predetermined pressure. The gas permits the hydraulic fluid volume to fluctuate under pressure.

The present invention relates to an improved hydraulic accumulator which provides a gas filled chamber which is restrained by a hydraulic pressure responsive diaphragm wherein the deflections of the diaphragm are controlled by strategically located guides.

SUMMARY OF THE INVENTION

It is therefore an object of the present invention to provide a hydraulic accumulator device comprising an outer housing provided with a chamber therein, means for coupling hydraulic fluid to said chamber, a thin walled cylinder operably disposed within said chamber, a sealable tubular diaphragm disposed within the chamber and provided with a plurality of adjustable guides disposed within the diaphragm wherein hydraulic fluid which enters the chamber communicates with a surface of the diaphragm and a pressure controlled gas disposed within the pressure vessel contacts the opposite surface of the diaphragm.

It is therefore a further object of the present invention to provide such a device which may be included as an independent unit in a hydraulic circuit or as an integral part in combination with other elements.

A further object of the present invention is to minimize the number of components, production tolerance and enhance reliability and maintainability.

A further object of the present invention is to permit a variation of volumetric compression ratio by altering the number of parts.

A further object of the present invention is to provide such a device which is simply and economically made and used.

These together with other objects and advantages which will become subsequently apparent, reside in the details and construction and operation as more fully hereinafter described and claimed, reference being had to the accompanying drawings forming a part hereof, wherein like numerals refer to like parts throughout, and in which:

DETAILED DESCRIPTION OF THE INVENTION

Figure 1:
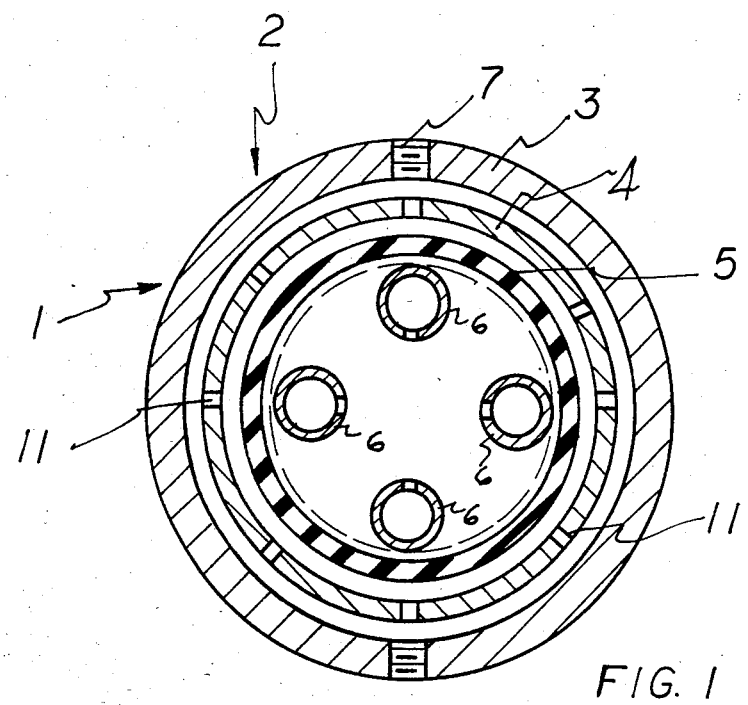
FIG. 1 is a cross-sectional view of an accumulator constructed in accordance with and embodying the present invention.

Referring now in more detail and by reference characters to the drawings which illustrate practical embodiments of the present invention, FIG. 1 is a cross-sectional view of a hydraulic accumulator device, 1, constructed in accordance with, used in, and embodying the present invention.

As shown in FIG. 1, hydraulic accumulator device, 1, comprises, pressure vessel means, 2, which includes cylinder, 3, a thin walled-cylinder, 4, diaphragm, 5, and four adjustable guides, 6. In operation, hydraulic fluid enters device, 1, via aperture, 7, in cylinder, 3, while a pressure controlled gas is pumped into diaphragm, 5, and disposed within diaphragm, 5.

Figure 2:
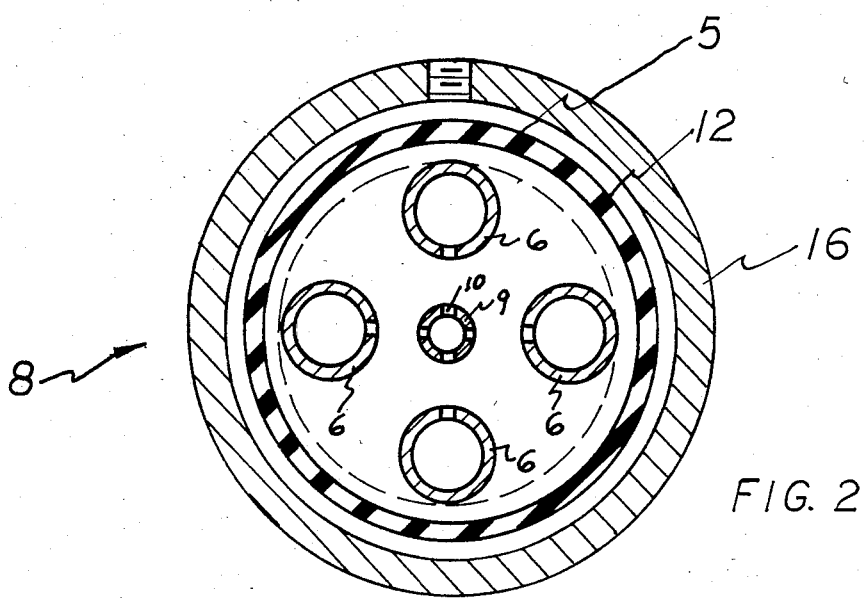
FIG. 2 is a cross-sectional view of another accumulator constructed in accordance with and embodying the present invention.

FIG. 2 is a cross-sectional view of an alternate embodiment, 8, of the accumulator device, 1, shown in FIG. 1.

As illustrated in FIG. 2, accumulator, 8, again has a cylinder, 16, within which diaphragm, 5, is disposed and guides, 6, which are disposed within diaphragm, 5. However, in this embodiment, thin-walled cylinder, 9, is disposed within diaphragm, 5, and is provided with apertures, 10. Apertures, 10, correlate with apertures, 11, in thin-walled cylinder, 4, in FIG. 1. In operation, in the embodiment shown in FIG. 1, device, 1, hydraulic fluid flows through apertures, 11, and communicates with "outer" surface of diaphragm, 5, whereas in the embodiment shown in FIG. 2, device 8, functions by allowing hydraulic fluid to enter accumulator, 8, via thin-walled cylinder, 9, and then pass through apertures, 10, to communicate with the interior suface of diaphragm, 5, while the pressure controlled gas enters cylinder, 3, and communicates with the exterior surface, 12, of diaphragm, 5.

Figure 3:
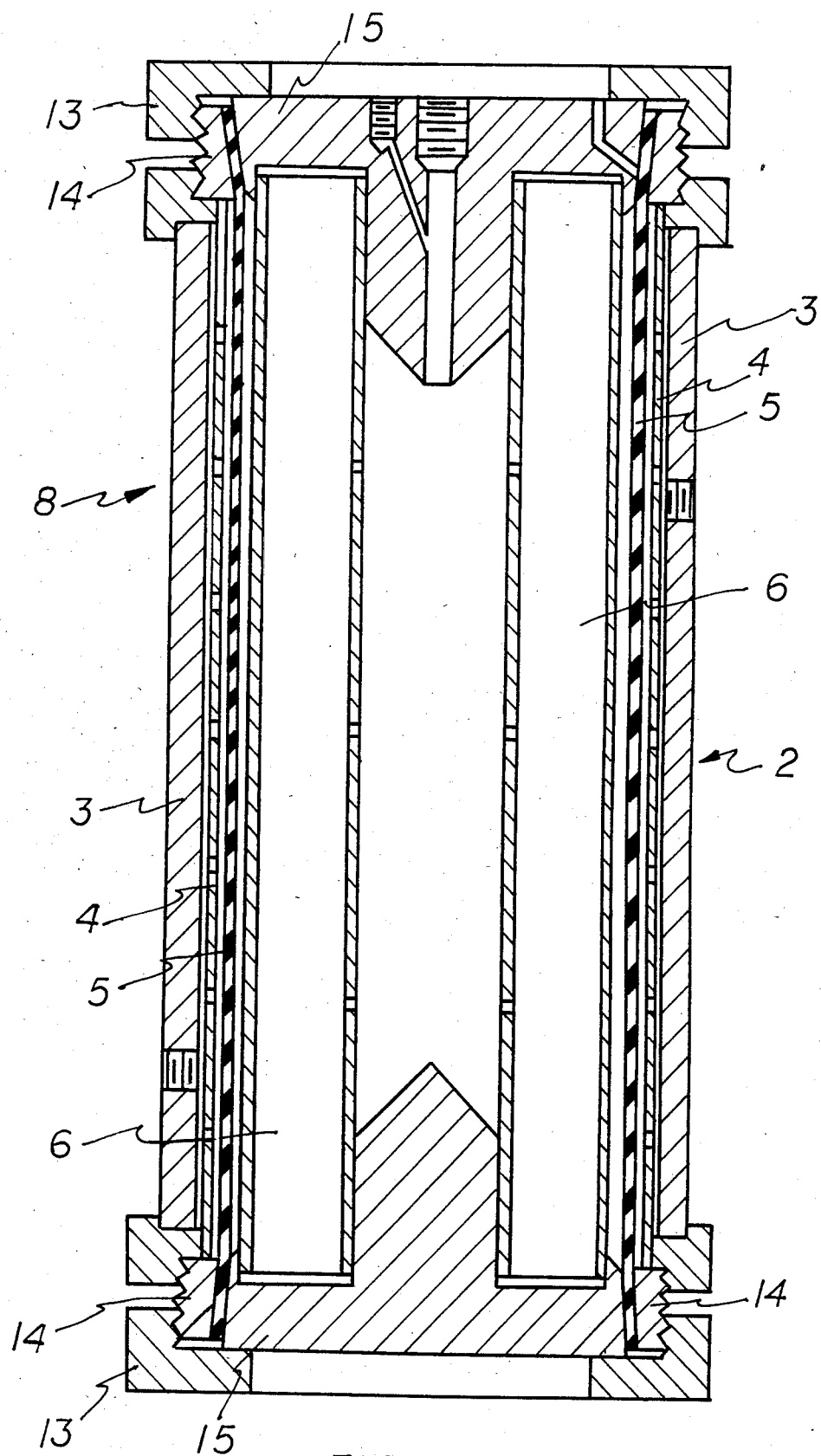
FIG. 3 is an elevation sectional view of the accumulator of FIG. 1.
Figure 4:
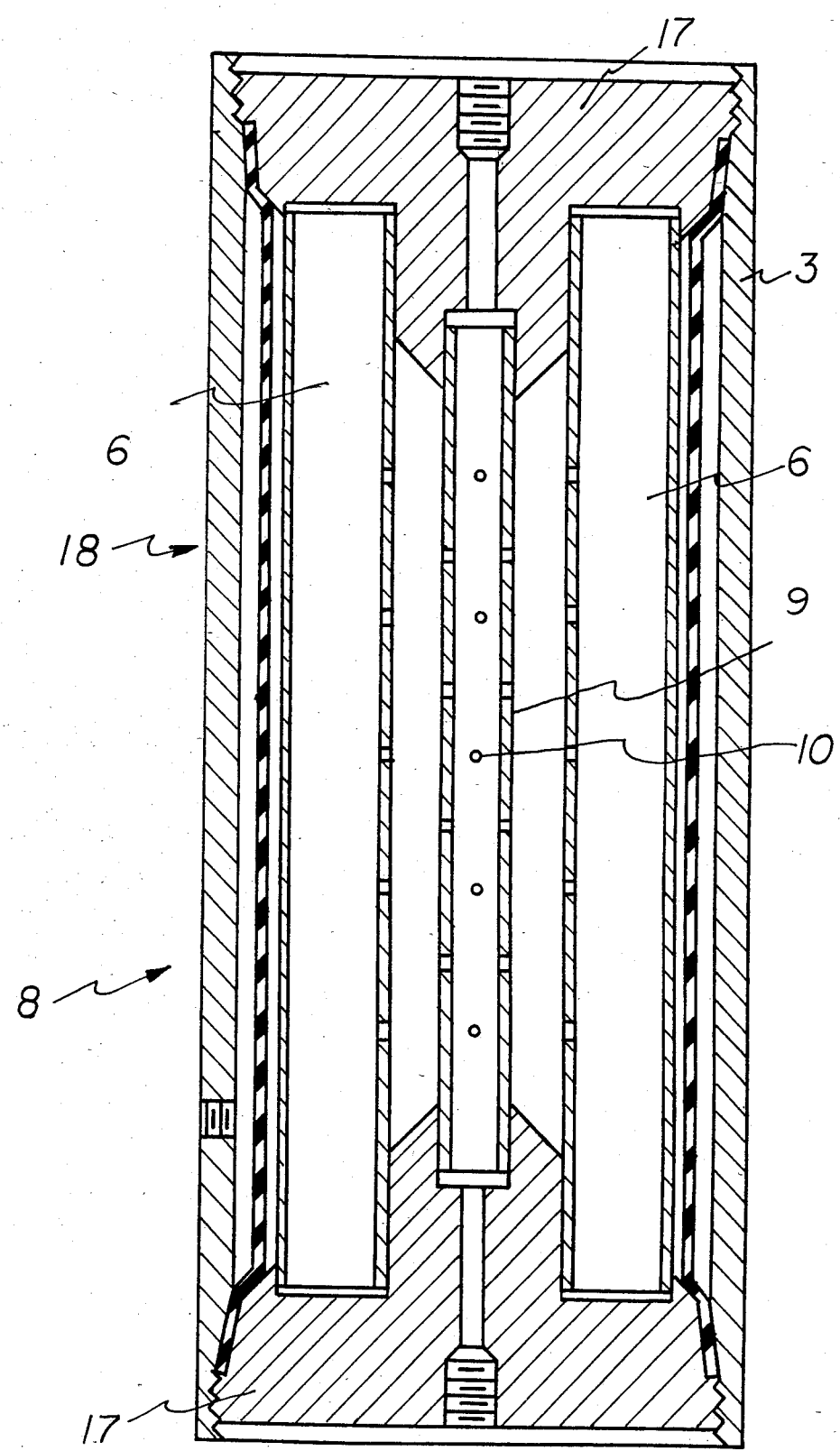
FIG. 4 is an elevation sectional view of the accumulator of FIG. 2.

Further details of accumulators, 1, and, 8, are shown in FIG. 3, and FIG. 4, wherein the devices are shown in elevational sectional views.

FIG. 3 shows accumulator, 1, provided wih cylinder, 3, which together with end caps, 13, guide retainers, 14, and end plugs, 15, form pressure vessel, 2, are thin-walled cylinder, 4, diaphragm, 5, and guides, 6.

FIG. 4 illustrates the construction of accumulator, 8, wherein cylinder, 3, end plugs, 17, make up pressure vessel, 18. Thin-walled cylinder, 9, is shown with apertures, 10, disposed wihin diaphragm, 5, along with guides, 6. Guides, 6, are considered as ajustable in that they are separated from thin-walled cylinder, 9, and are readily changeable in size, radial separation and quantity utilizing conventional means such as recesses in the end plugs, 15.

It should be understood that changes and modifications in the form, construction, arrangement, and combination of the hydraulic accumulator device and methods of making and using the same may be made and substituted for those herein shown and described without departing from the nature and principle of my invention.

Having thus described my invention, what I claim is new and desire to secure by United States Letters Patent is:

1. A hydraulic accumulator device for providing regulated hydraulic energy storage of hydraulic fluid under pressure comprising, a pressure vessel provided with a chamber therein, a thin-walled fluid entry cylinder disposed within said chamber, hydraulic fluid under pressure entering said thin-walled fluid entry cylinder and communicating between an external supply and the said chamber via a plurality of ports in the wall of said vessel, a sealable tubular diaphragm disposed within said pressure vessel, a plurality of adjustable guides disposed within said diaphragm, each of said guides comprising a thin-walled, elongated cylindrical element provided with a wall, space interior thereto and a plurality of apertures in said walls of said elements allowing fluid communication between the interior and exterior of said guides, said guides disposed apart from said thin-walled fluid entry cylinder, a pressure controlled gas disposed within said pressure vessel external to said diaphragm, said thin-walled fluid entry cylinder disposed within said diaphragm and provided with a plurality of apertures disposed about its entire peripheral surface to permit said fluid to pass through the apertures in the thin-walled fluid entry cylinder and communicate with the interior surface of said diaphragm.

* * * * *